United States Patent
Yee

(10) Patent No.: US 8,587,213 B2
(45) Date of Patent: Nov. 19, 2013

(54) EL LAMP DRIVER WITH PLURAL OUTPUTS

(75) Inventor: Harold Gee Yee, Chandler, AZ (US)

(73) Assignee: World Properties, Inc., Lincolnwood, IL (US)

( * ) Notice: Subject to any disclaimer, the term of this patent is extended or adjusted under 35 U.S.C. 154(b) by 1185 days.

(21) Appl. No.: 11/732,648

(22) Filed: Apr. 3, 2007

(65) Prior Publication Data
US 2008/0246408 A1   Oct. 9, 2008

(51) Int. Cl.
*H05B 41/36* (2006.01)

(52) U.S. Cl.
USPC ............... 315/291; 315/169.3; 315/209 T

(58) Field of Classification Search
USPC ............... 315/169.1–169.3, 291
See application file for complete search history.

(56) References Cited

U.S. PATENT DOCUMENTS

| | | | | |
|---|---|---|---|---|
| 4,730,242 A * | 3/1988 | Divan | ............... | 363/37 |
| 5,336,978 A * | 8/1994 | Alessio | ............... | 315/169.3 |
| 5,982,105 A * | 11/1999 | Masters | ............... | 315/169.3 |
| 6,091,164 A * | 7/2000 | Buell | ............... | 307/82 |
| 6,867,755 B2 * | 3/2005 | Ashizawa et al. | ............... | 345/76 |
| 2002/0143887 A1 * | 10/2002 | Hatemata | ............... | 709/208 |
| 2004/0007986 A1 * | 1/2004 | Parra et al. | ............... | 315/169.1 |
| 2005/0225515 A1 * | 10/2005 | Tsuchida et al. | ............... | 345/76 |

\* cited by examiner

*Primary Examiner* — Douglas W Owens
*Assistant Examiner* — Jianzi Chen
(74) *Attorney, Agent, or Firm* — Cantor Colburn LLP

(57) ABSTRACT

A driver for electroluminescent (EL) lamps is an integrated circuit that includes a first transistor, a second transistor, and an inductor connected in series between the first transistor and the second transistor. The driver also includes at least four output circuits coupled to said inductor for separately driving at least four electroluminescent lamps. The driver further includes memory for storing data representing dimming levels and device addresses. Data is communicated to the driver through a serial interface that recognizes at least one standard protocol.

4 Claims, 1 Drawing Sheet

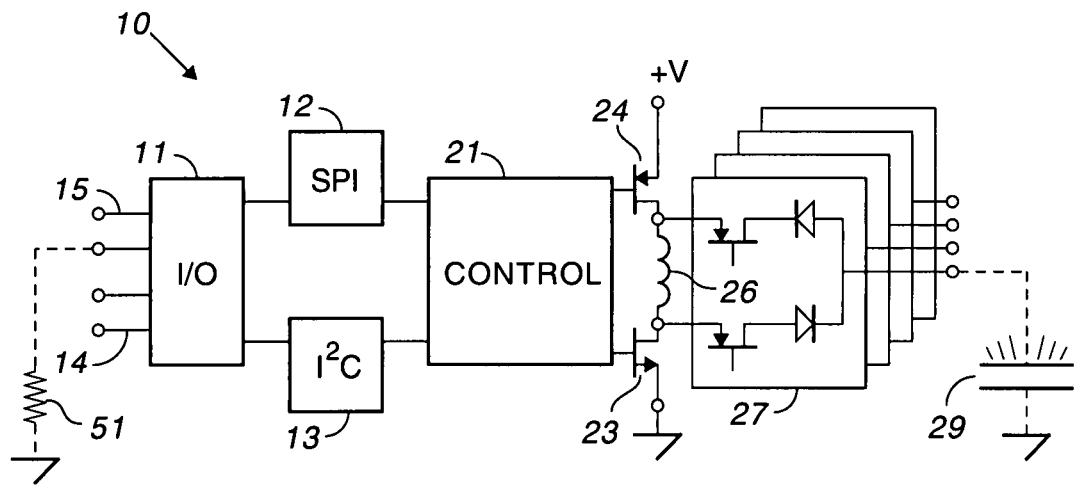
F I G. 1
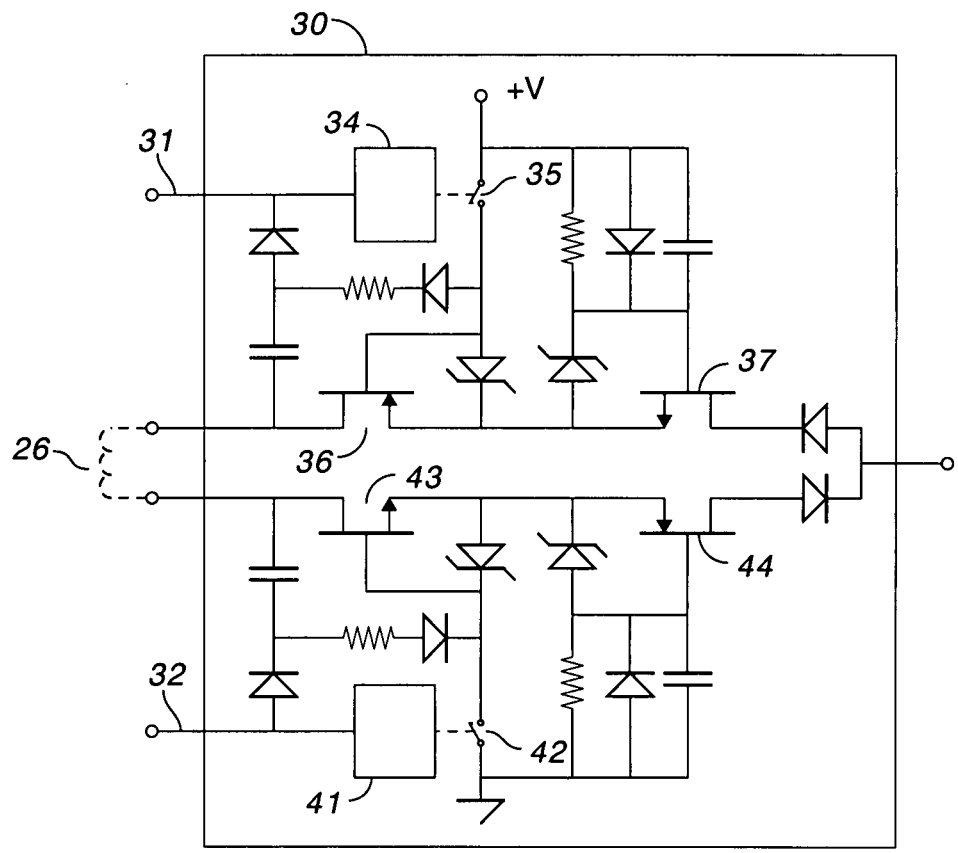
F I G. 2

EL LAMP DRIVER WITH PLURAL OUTPUTS

BACKGROUND OF THE INVENTION

This invention relates to battery operated inverters for converting low voltage direct current into high voltage alternating current and, in particular, to an inverter for driving a plurality of EL lamps separately.

As used herein, an EL "panel" is a single sheet including one or more luminous areas, wherein each luminous area is an EL "lamp." An EL lamp is essentially a capacitor having a dielectric layer between two conductive electrodes, one of which is transparent. The dielectric layer can include phosphor particles or there can be a separate layer of phosphor particles adjacent the dielectric layer. The phosphor particles radiate light in the presence of a strong electric field, using relatively little current.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

A suitable voltage can be obtained from an inverter using a transformer. For a small panel, a transformer is relatively expensive. The prior art discloses several types of inverters in which the energy stored in an inductor is supplied to an EL lamp as a small current at high voltage as the inductor is discharged, either through the lamp or into a storage capacitor. The voltage on the lamp or the capacitor is pumped up by a series of pulses from the inductor. Capacitive pump circuits are also known but are not widely used commercially.

The high voltage direct current must be converted into an alternating current in order to power an EL lamp. U.S. Pat. No. 4,527,096 (Kindlmann) discloses a switching bridge for this purpose. The bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

It is known in the art to power more than one EL lamp from a single driver; e.g. see the data sheets for Supertex HV831 or HV858 lamp drivers. In these drivers, one half of a full bridge is coupled to each output. The EL lamps have one terminal in common, which is connected to a common half bridge. A serial interface is disclosed for selecting outputs. The brightness of the lamps is externally controllable in the HV858 lamp driver using a three bit code (seven levels of brightness and off).

In the patent literature, U.S. Pat. No. 6,121,943 (Nishioka et al.) discloses a plurality of half bridge outputs coupled to one electrode of EL lamps and a single half bridge coupled in common to the second electrodes of the EL lamps. U.S. Pat. No. 6,867,755 (Ashizawa et al.) discloses a single integrated circuit coupling alternating current to a plurality of EL lamps. U.S. Pat. No. 7,109,954 (Wong et al.) discloses drivers that can be cascaded and separately addressed for driving a display having plural segments, wherein each segment is an EL lamp. These patents relate to displays in which the EL lamps are pixels and have an area that is a small fraction of a square centimeter. The lamps are not used for backlighting. This invention relates to lamps used for backlighting.

As known in the art, the current drawn by an EL lamp, while small, is not insignificant and is approximately proportional to area. Thus, the size of the lamps affects loading, which affects brightness. Lamps used for backlighting must be driven in a way that does not cause one lamp to be noticeably brighter or dimmer than another. While it is known in the art to provide a few levels of dimming, it is desired to have a larger number of levels, e.g. corresponding to five bits of data (thirty-one levels and off), for better matching.

In view of the foregoing, it is therefore an object of the invention to provide an EL driver capable of selectively powering a plurality of EL lamps, wherein each lamp has an area greater than approximately one square centimeter.

Another object of the invention is to provide an EL driver compatible with standard serial interface protocols for controlling dimming and enable.

A further object of the invention is to provide an EL driver that can be configured to at least three addresses.

Another object of the invention is to provide an EL driver having plural outputs wherein each output includes five bit level control.

SUMMARY OF THE INVENTION

The foregoing objects are achieved in this invention in which a driver includes a first transistor, a second transistor, and an inductor connected in series between the first transistor and the second transistor. The driver also includes at least four output circuits coupled to said inductor for separately driving at least four electroluminescent lamps and memory for storing data representing dimming levels and device addresses. Data is communicated to the driver through a serial interface that includes at least one standard protocol.

BRIEF DESCRIPTION OF THE DRAWING

A more complete understanding of the invention can be obtained by considering the following detailed description in conjunction with the accompanying drawing, in which:

FIG. 1 is a block diagram of an EL driver constructed in accordance with a preferred embodiment of the invention; and FIG. 2 is a schematic diagram of a portion of the circuit illustrated in FIG. 1.

DETAILED DESCRIPTION OF THE INVENTION

In FIG. 1, driver 10 includes I/O (input/output) interface 11 having several inputs and having at least two outputs. A first output is coupled to SPI (Serial Peripheral Interface) 12 and a second output is coupled to I²C interface 13. These interfaces are currently standard in the art. The invention can incorporate any standard serial interface. These two are disclosed because they are currently in use, e.g., by manufacturers of cellular telephones. The choice of interface is made by input 14. A "high" or logic "1" selects SPI interface 12, for example, and a "low" or logic "0" selects I²C interface 13. The assignment of interfaces is arbitrary. Once selected, serial data, for example on input 15, is sent to the appropriate interface for decoding.

Coupled to interfaces 12 and 13 is control circuit 21, which decodes addresses from the serial data and provides control signals to transistors 23 and 24, among other functions. Transistors 23 and 24 switch current through inductor 26 and, in cooperation with output 27, provide a series of pulses of a first polarity through EL lamp 29, then a series of pulses of the opposite polarity through EL lamp 29. The result is an alternating current that causes EL lamp 29 to emit light.

The operation of the inverter is described in detail in U.S. Pat. No. 5,313,141 (Kimball). Briefly, while transistor 24 conducts, transistor 23 turns on and off, causing positive pulses to be coupled to EL lamp 29. After a predetermined time, or number of pulses, the situation reverses and transistor 23 conducts while transistor 24 turns on and off, causing negative pulses to be coupled to EL lamp 29. The polarity of the pulses reverses at low frequency to produce an alternating current through lamp 29. Each output operates in the same fashion under the control of circuit 21 for powering other lamps.

One output circuit is illustrated in greater detail in FIG. 2. Whether or not output 30 conducts is determined by the logic levels applied to selection inputs 31 and 32. A logic level "1" on input 31 causes the upper or negative half of output 30 to conduct. A logic level "1" on input 32 causes the lower or positive half of output 30 to conduct. The logic levels can both be "0" but cannot both be "1". If output 30 is active, the logic levels switch in accordance with the low frequency polarity reversals of switching transistors 23 and 24.

A logic "1" on input 31 causes control 34 to close switch 35, causing transistor 36 to become conductive. Pulses from inductor 26 cause transistor 37 to conduct. Similarly, a logic "1" on input 32 causes control 41 to close switch 42, causing transistor 43 to become conductive. Pulses from inductor 26 cause transistor 44 to conduct. If a lamp has a positive charge, transistor 37 is biased off, preventing discharge, which is handled by another portion of the circuit (not shown). If a lamp has a negative charge, transistor 44 is biased off, preventing discharge.

The number and size of the lamps that can be powered by a single driver is determined largely by the size of inductor 26. In one embodiment of the invention, an inductance of 220 µH was sufficient to drive one lamp having an area of three square inches, one lamp having an area of one square inch, and two lamps having an area of one half square inch, for a total of five square inches (12.7 square cm.).

Dimming is controlled by the data sent to control circuit 21 from I/O 11. In a preferred embodiment of the invention five bits of data are stored for each output, along with the corresponding address of the output. The data is loaded into a digital to analog converter (DAC) and the output of the DAC is compared with the lamp voltage. Charging stops when the two are equal. The lamps are driven simultaneously. The lamps are charged in ascending order. That is, all the lamps are charged to a first polarity simultaneously. Charging is terminated for the dimmest lamp when the voltage on that lamp equals the DAC voltage. The remaining lamps continue to be charged. Charging for the second dimmest lamp is terminated at the next higher DAC voltage while the remaining lamps are charged, and so on until the brightest lamp is charged to a first polarity. The lamps are discharged and the process continues for the opposite polarity.

To simplify communication, a default value of dimming can be used, e.g. full brightness or half brightness. That is, unless the driver is told otherwise, the lamps are driven at the default value, which need not be the same for all lamps.

One could count the number of charging pulses and control brightness by the number of pulses. In this case, the five bits represent the number of pulses or the most significant bits of the number of pulses for each half cycle. A problem is that the current drawn is non-linear because it depends upon the load; that is, upon the number and size of the lamps being driven. By monitoring lamp voltage, this problem is avoided.

Depending upon application, the levels of light emission may not vary from zero to full brightness. Instead, it can vary from zero perceived luminosity to some higher level, which may not be the maximum a lamp can produce. Stated another way, there is no sense having thirty-one levels if only the last two or three levels can be perceived. The five bits of data can be combined with an offset to accommodate perceived brightness. For example, a six bit DAC can be used with the most significant bit always set to logic "1". Alternatively, a five bit number can be added to the incoming five bits and the sum applied to a six bit DAC.

I/O 11 preferably includes at least one pin that sinks or sources current for chip addressing. As illustrated in FIG. 1, resistor 51 provides a current path to ground (sinking current). The value of resistor 51 can be infinite (no resistor), an intermediate value (e.g. 22 kΩ), or zero ohms to provide three current levels. These current levels are detected within I/O 11 and identify the driver as one of three. For example, the external resistor can be part of a voltage divider coupled to an A/D (analog to digital) converter. The output of the A/D converter is an address that is compared with a stored address. In the example given, only two of the most significant bits of the output from the A/D converter are needed for four unique addresses. A driver constructed in accordance with the invention can be addressed uniquely, if desired, when several drivers are used simultaneously.

The invention thus provides an EL driver capable of selectively powering a plurality of EL lamps, wherein each lamp has an area greater than approximately one square centimeter. The EL driver is compatible with standard serial interface protocols for controlling dimming and addressing. The driver itself can be configured to at least several addresses. For example, resistor 51 is compatible with the I$^2$C interface. A resistor having a resistance of 100 kΩ can be used for the SPI interface. The invention provides an EL driver having plural outputs wherein each output includes five bit level control.

Having thus described the invention, it will be apparent to those of skill in the art that various modifications can be made within the scope of the invention. For example, although illustrated as separate elements, a driver constructed in accordance with the invention is implemented in a single integrated circuit as a special purpose microprocessor or microcontroller having an arithmetic logic unit, program memory, data memory, I/O, digital to analog converters, comparators and the like, with as few external components, such as inductors and capacitors, as possible. The driver preferably includes a graduated discharge for minimizing noise, such as disclosed in U.S. Pat. No. 5,789,870 (Remson).

The invention claimed is:

1. A driver for supplying alternating current to electroluminescent lamps having an area greater than one square centimeter, said driver being a single circuit including a first transistor, a second transistor, and terminals for connecting an inductor in series between the first transistor and the second transistor characterized in that said driver includes at least four output circuits coupled to said terminals, each output circuit capable of independently driving at least one electroluminescent lamp; and further including a serial interface and a control circuit coupled to said serial interface and said output circuits, characterized in that said control circuit includes a five bit register that stores data representing dimming level; wherein said control circuit controls dimming individually for each output circuit; wherein each output circuit repeatedly charges an electroluminescent lamp to a first polarity and then to the opposite polarity and wherein charging is terminated in the order of dimming among the active outputs.

2. The driver as set forth in claim 1 wherein the data representing dimming level includes default data.

3. The driver as set forth in claim 1 wherein said control circuit further includes memory that stores at least two addresses.

4. The driver as set forth in claim 3 wherein said driver includes at least one pin for coupling to a resistor, the resistance of which indicates an address.

* * * * *